United States Patent [19]
Uken et al.

[11] Patent Number: 5,343,541
[45] Date of Patent: Aug. 30, 1994

[54] OPTICAL BYPASS SWITCH

[75] Inventors: William D. Uken, Fremont; Akira Tomita, Redwood City, both of Calif.

[73] Assignee: Raychem Corporation, Menlo Park, Calif.

[21] Appl. No.: 856,039

[22] Filed: May 7, 1992

Related U.S. Application Data

[60] Continuation-in-part of Ser. No. 551,117, Jul. 11, 1990, abandoned, which is a division of Ser. No. 455,200, Dec. 20, 1989, Pat. No. 4,961,620.

[51] Int. Cl.⁵ ............................................. G02B 6/42
[52] U.S. Cl. ................................. 385/16; 385/25; 385/32; 385/48
[58] Field of Search ................... 385/32, 48, 16, 25

[56] References Cited

U.S. PATENT DOCUMENTS

| | | | |
|---|---|---|---|
| 3,936,631 | 2/1976 | Muska | 385/32 |
| 4,452,507 | 6/1984 | Winzer | 385/21 |
| 4,715,673 | 12/1987 | Noro et al. | 385/19 |
| 4,741,585 | 5/1988 | Uken | 385/32 |
| 4,789,215 | 12/1988 | Anderson et al. | 385/18 |
| 4,822,125 | 4/1989 | Beals et al. | 385/48 |
| 4,854,660 | 8/1989 | Gutterman et al. | 385/18 |
| 4,874,218 | 10/1989 | Bowen et al. | 385/16 |
| 4,879,215 | 11/1989 | Weng et al. | 435/7.91 |
| 4,927,225 | 5/1990 | Levinson | 385/16 |
| 4,961,620 | 10/1990 | Uken et al. | 385/32 |
| 4,983,007 | 1/1991 | James et al. | 385/32 |
| 5,028,104 | 7/1991 | Kokoshvili | 385/18 |
| 5,040,866 | 8/1991 | Engel | 385/32 |

FOREIGN PATENT DOCUMENTS

| | | |
|---|---|---|
| 0299604 | 5/1988 | European Pat. Off. |
| 4740378 | 11/1987 | Fed. Rep. of Germany |
| 8401835 | 10/1983 | World Int. Prop. O. |

OTHER PUBLICATIONS

Patent abstract of Japan, vol. 9, No. 6 (p326) (1729), Jan. 11, 1985 & JP, A,59154406 (Nippon Denshin Denwa Kosha), Sep. 3, 1984.

*Primary Examiner*—Frank Gonzalez
*Attorney, Agent, or Firm*—Herbert G. Burkard

[57] ABSTRACT

An optical bypass switch includes a normal state and a bypass state, a transmission optical fiber having a signal withdrawn therefrom and injected thereto in its normal state so as to be capable of use in a ring or bus architecture. In the bypass state of the switch, the transmission optical fiber is substantially disengaged so that a signal being transmitted thereby can bypass the switch, and in this state optical fibers connected to a transmitter and a receiver of the bypass switch are maintained in a bent attitude so as to allow signals to be withdrawn and injected thereinto. A loop back path, e.g. a connector optical fiber, is provided which allows a path between the transmitter and the receiver to be completed in the bypass state of the bypass switch, and logic circuitry is provided for analyzing signals detected by the receiver which should have originated from the transmitter for evaluating a state of operation of the transmitter, receiver, and connecting means therefor. Whenever the logic circuitry detects a malfunction in any of these elements, e.g. the transmitter, the receiver and connecting structure therefor, the optical bypass switch is kept in its bypass state and prevented from re-engaging the transmission fiber so as to prevent the bypass switch from optically coupling to the transmission fiber when its electro-optic elements are not functioning properly.

7 Claims, 3 Drawing Sheets

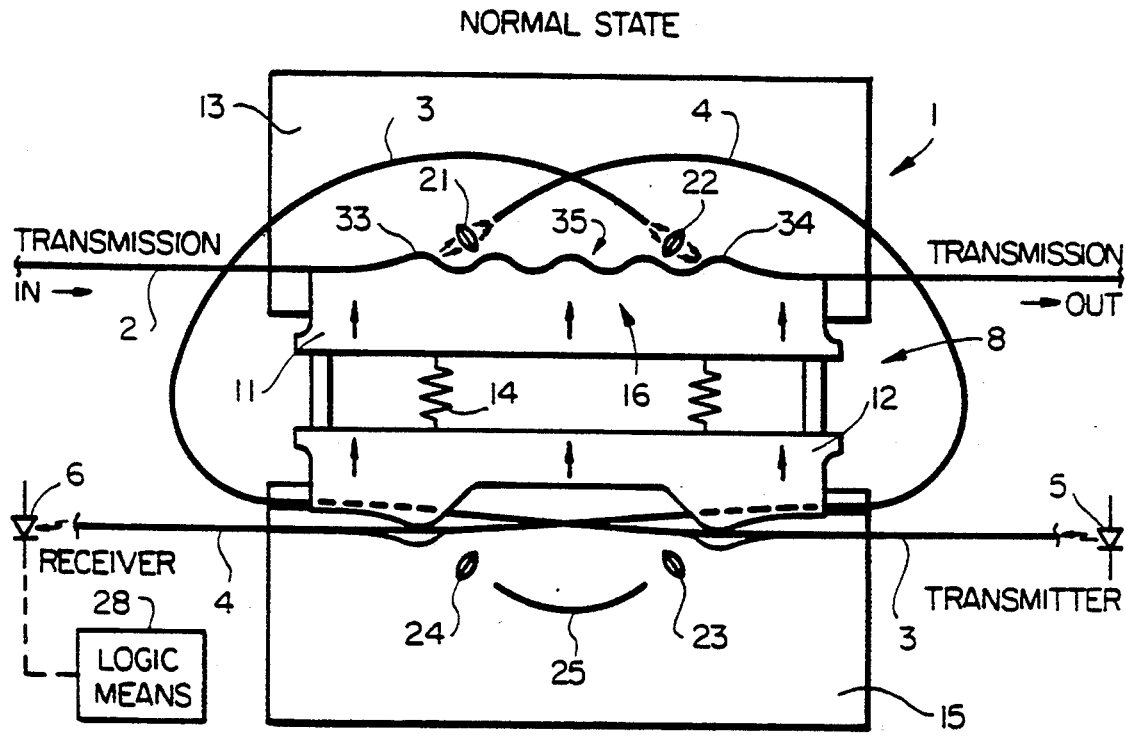
FIG_1
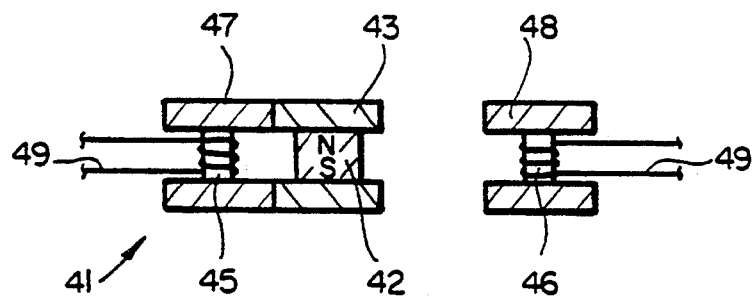
FIG_3

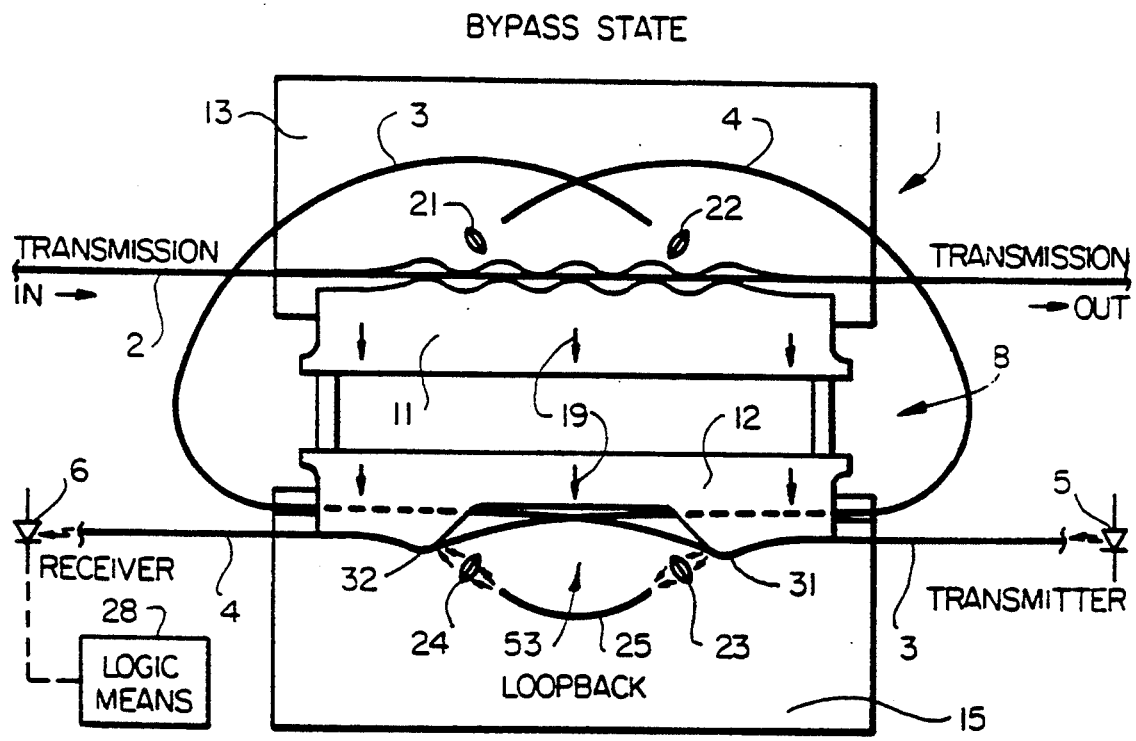
FIG_2
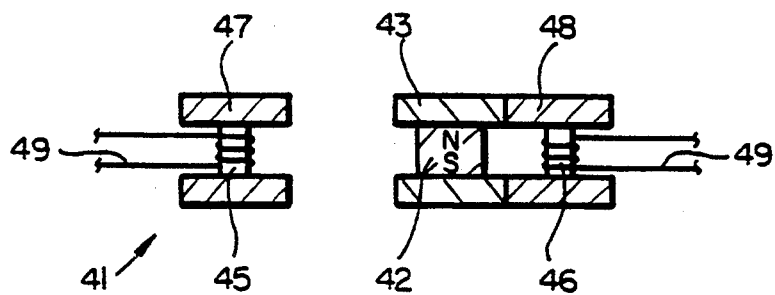
FIG_4

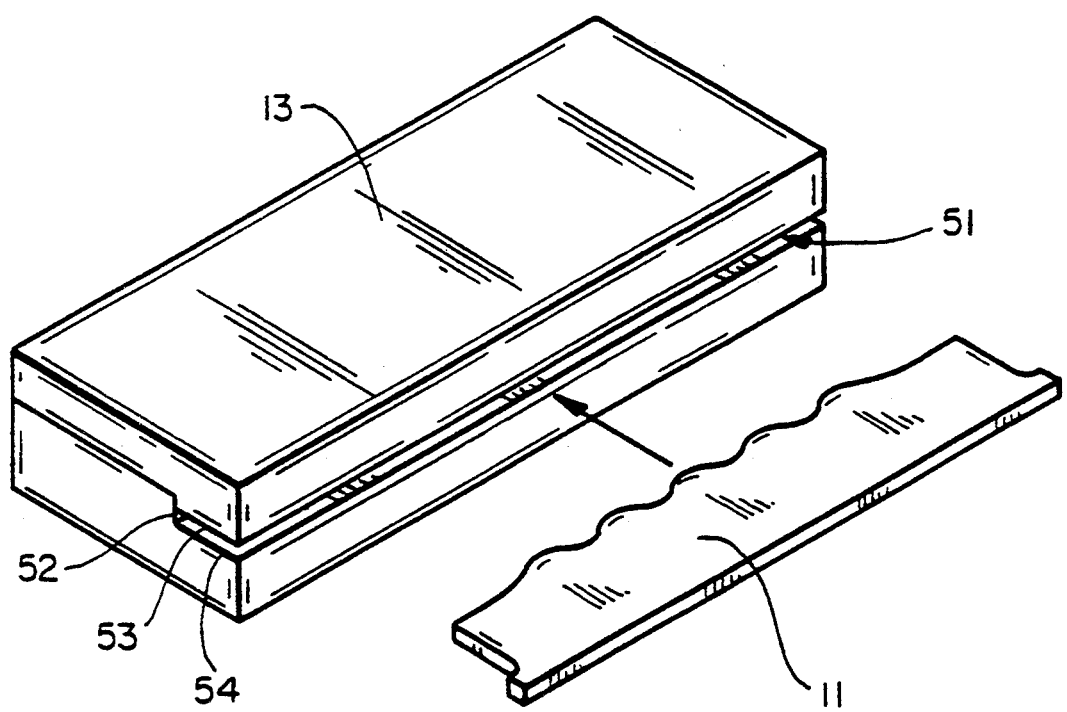
FIG_5

OPTICAL BYPASS SWITCH

This application is a continuation-in-part of U.S. Ser. No. 07/551,117 filed on Jul. 11, 1990, now abandoned, which is a divisional of Ser. No. 07/455,200 filed on Dec. 20, 1989, now U.S. Pat. No. 4,961,620.

The present invention relates to an optical bypass switch for a ring or bus network, to preferred drive mechanisms therefor, and methods of coupling to transmission fibers.

Beals et al., U.S. Pat. No. 4,822,125, the disclosure of which is incorporated herein by reference, describes an optical fiber coupler for use in a ring or bus architecture whereby a transmission optical fiber is bent so as to remove a signal therefrom, and also bent so as to inject an optical signal therein, the coupler including attenuating means between the injection and withdrawal locations for attenuating any signal left within the optical fiber so as to improve signal-to-noise ratios between any nonremoved portion of the signal in the fiber and that being injected. Though this coupler advantageously allows coupling to the transmission optical fiber in normal use, a need exists for a coupler which is capable of evaluating its state of operation in its bypass state and utilizing this information so as to minimize chances that the coupler will be returned to its normal state when opto-electronic or interconnecting components thereof are not functioning properly.

It is an object of the invention to eliminate the above noted drawback and to provide an optical bypass switch which includes means for evaluating a state of a transmitter and receiver as well as interconnecting components therefor and determining if these elements are functioning properly prior to returning the coupler to its normal state.

These and other objects of the invention are achieved by an optical bypass switch, comprising:

an optical receiver;

an optical transmitter;

means for withdrawing a first optical signal from a first bend in a transmission optical fiber at a first location and transmitting the first optical signal to the receiver;

means for injecting a second optical signal from the transmitter into the transmission optical fiber at a second bend at a second location downstream of the first location on the transmission optical fiber;

means for disengaging the withdrawing means and the injecting means from the transmission fiber in a bypass state so that the first optical signal can be transmitted without being withdrawn by the withdrawing means;

means for optically connecting the transmitter with the receiver so that signals transmitted by the transmitter can be detected by the receiver when the withdrawing means is disengaged.

The invention further includes a method of selectively accessing a transmission optical fiber, comprising the steps of:

withdrawing a first optical signal from a first bend in a transmission optical fiber at a first location and transmitting the first optical signal to a receiver;

injecting a second optical signal from a transmitter into the transmission optical fiber at a second location downstream of the first location on the transmission optical fiber;

disengaging couplers for withdrawing the first signal and for injecting the second signal from and into the transmission optical fiber when a bypass state is desired so that the first optical signal can be transmitted in the transmission optical fiber without being withdrawn and the second signal is not injected into the transmission optical fiber;

connecting the transmitter with the receiver so that signals transmitted by the transmitter can be detected by the receiver when in the bypass state.

Finally the invention includes an optical coupler for coupling light between a core of an optical fiber and an electromagnetic transducer, comprising:

means for forming a curved channel having a curved end and a top and bottom channel face extending substantially perpendicular from the curved end so as to form a captivating channel for an optical fiber, the top and bottom channel faces being separated by a distance less than twice a diameter of an outer coating of the fiber;

a curved engaging member engageable with the curved channel;

means for urging the engageable member into the channel and keeping the optical fiber bent between an end face of the engaging member and the channel end.

FIG. 1 illustrates a first preferred embodiment of the invention, a coupler shown therein being illustrated in its normal state;

FIG. 2 illustrates the coupler of FIG. 1 in its bypass state;

FIG. 3 illustrates detailed structure of a bypass drive mechanism useable in the embodiment of FIGS. 1 and 2;

FIG. 4 illustrates the bypass drive of FIG. 3 in its bypass state; and

FIG. 5 illustrates a detailed construction of a bending mechanism for bending a transmission optical fiber in an optical bypass switch as illustrated in FIGS. 1 and 2.

FIGS. 1 and 2 illustrate plan views of a first embodiment of an optical bypass switch and method according to the invention, FIG. 1 illustrating the bypass switch in its normal state when normal coupling and communication with a transmission optical fiber 2 is achieved, and FIG. 2 showing a bypass state where the transmission optical fiber is decoupled and means are engaged for connecting a path between a transmitter 5 and a receiver 6.

Referring to these figures, the optical bypass switch is optimally usable in either a bus or ring network which utilizes a transmission optical fiber 2 and any desired protocol. The transmission optical fiber 2, in a normal state of the optical bypass switch 1, is bent between first and second members 11, 13 about a radius sufficiently small such that light can be withdrawn from a core of an optical fiber through a side surface thereof and injected into a receiver optical fiber 4, optimally using a focusing lens 21. The lens can be an in-plane lens or an out-of-plane lens, a preferred out-of-plane lens being disclosed in Uken, U.S. Pat. No. 4,741,585, the disclosure of which is incorporated herein by reference. Light is withdrawn from the transmission fiber 2, focused by the lens 21, transmitted by the fiber 4, and detected by the receiver 6. In addition, a further bend created in the transmission fiber 2 by the members 11, 13 allows light emitted by the transmitter 5 and transmitted by the transmitter fiber 3 to be injected into the transmission fiber, optimally with the use of a further focusing lens 22, in-plane or out-of-plane. Accordingly, in normal operation a first optical signal is withdrawn from the transmission fiber 2 and detected by the receiver 6, and a second optical signal is injected into the transmission fiber 2 from the transmitter 5. Preferably, in the state of FIG. 1, the member 11 is resiliently urged in contact with the member 13 using resilient springs 14.

In addition, attenuating means 16 optimally can be provided to reduce a magnitude of the first optical signal in the transmission optical fiber at a location downstream from the location where a portion of the first optical signal is withdrawn from the transmission fiber for detection by the receiver 6 so as to improve a signal-to-noise ratio between the signal being injected at the second location in the transmission optical fiber from transmitter 5 and the original first optical signal being propagated by the transmission fiber and into the optical bypass switch. In the embodiment of FIGS. 1 and 2, the attenuating means comprises a series of bends in the optical fiber. Other attenuating means are also usable in accordance with the present invention, e.g. circular bends, etc.

In the normal state shown in FIG. 1, a second bending member 12 is shown in a disengaged state from a member 15. In this attitude, minimal bending of either the transmission optical fiber 3 or the receiver optical fiber 4 is created by the members 12, 15. However, in the bypass state shown in FIG. 2, the member 11 is disengaged from the transmission optical fiber so that the first optical signal is not withdrawn from the transmission optical fiber at a bend and the second optical signal is not injected into the transmission optical fiber at a second bend. Also, in this state the member 12 has been moved downward along the direction of arrows 19 from the state illustrated in FIG. 1 so that the transmitter optical fiber 3 is bent at location 31 an amount sufficient for the second optical signal from the transmitter 5 to be withdrawn from the fiber 3 and "loop backed" and injected into a bend 32 in the receiver optical fiber 4 thus allowing the receiver 6 to detect the second optical signal. According to the embodiment illustrated, connecting means for connecting the transmitter and receiver fibers so as to allow the second signal to be transmitted from the transmitter to the receiver includes the bends, 31, 32, optimally focusing lenses 23, 24, and preferably a connecting optical fiber 25 arranged as illustrated. Since the first and second bending members 11, 12 are interconnected and moveable integrally, in the bypass state illustrated in FIG. 2, the member 11 is shown substantially disengaged from its mating member 13 thereby substantially disengaging the means for bending the transmission optical fiber for signal withdrawal, injection, and attenuation. Thus in the bypass state a node connected to the optical bypass switch is transparent to a network using the transmission optical fiber so that signals being transmitted thereby can bypass that node. In addition, since in the bypass state the transmitter 5 is optically connected to the receiver 6, by the use of logic means 28, the optical bypass switch can easily determine whether or not the transmitter and receiver are operating properly so that the optical bypass switch can safely be returned to its normal state and adequately receive and detect the first optical signals on the transmission optical fiber and further inject the second optical signals into the transmission optical fiber, as desired.

FIG. 3 illustrates a sectional view of a drive mechanism for moving the first and second bending members 11, 12 between the states illustrated in FIGS. 1 and 2, e.g. the normal and bypass states. Referring to FIG. 3, the bypass means drive includes a moveable permanent magnet 42 connected to a similarly moveable primary ferromagnetic material 43. The bypass means drive further includes first and second electromagnets 46, 47 respectively connected to first and second ferromagnetic materials 47, 48, these materials and electromagnets being stationary. Reference numeral 49 illustrates an electrical current carrying coil for activating the electromagnets 45, 46. In one state, e.g. the normal state for the optical bypass switch, the primary ferromagneric material 43 is in contact with the first ferromagnetic material 47 due to a strength of the magnetic field created by the permanent magnet 42 when current is not being conducted by the coil 49. When the optical bypass switch is to enter its bypass state, a current is generated and transmitted by the coil 49 in either or both of the electromagnets so as to create a force which either repels the permanent magnet 42 away from the first electromagnet 45 and/or alternatively attracts the permanent magnet 42 towards the second electromagnet 46. Optimally, the coil 49 can be arranged around the electromagnets such that when the bypass state is desired, a field created by the first electromagnet 45 repels the field created by the permanent magnet 42 and the field created by the second electromagnet 46 attracts the field generated by the permanent magnet 42. Accordingly, the permanent magnet 42 is repelled from the first electromagnet 45 and first ferromagnetic material 47 and attracted towards the second electromagnet 46 and the second ferromagnetic material 48 so as to achieve the state illustrated in FIG. 4. Once in this state, it is apparent that the current source can be discontinued and further movement will not occur due to the normal attractive force normally created between the ferromagnetic materials 43, 48 due to the magnetic field generated by the permanent magnet 42. Likewise, when the optical bypass switch is to return to its normal state, a reverse current can be generated in the coil 49 thus repelling the permanent magnet 42 from the second electromagnet 46 and towards the first electromagnet 45. According to a preferred embodiment, the first and second electromagnets are respectively located in a vicinity of the bypass switch stationary members 13, 15, with the moveable first and second bending members 11, 12 being attached to the moveable permanent magnet 42 so as to be moveable therewith. According to one preferred embodiment, two sets of drive magnets are used, one on each longitudinal end of the members 11, 12 so as to avoid or minimize any rotational torques imposed on the members 11, 12 which are selectively engageable with either the stationary members 13, 15.

A further feature of the invention is illustrated in FIG. 5, this figure illustrating details of the members 11, 13 used to bend the transmission optical fiber. Specifically, the member 13 forms a curved channel 51 having a curved end 52 against which an optical fiber is to be resiliently urged, the channel 51 including a top and bottom face respectively which are optimally separated by a distance approximately equal to an outside diameter of an outer coating layer of the transmission optical fiber to be bent. To reduce tolerance requirements, the top and bottom faces can be separated by a distance somewhat larger than the outside diameter of the optical fiber outer coating layer, e.g. as much as twice this diameter, though optimally the distance is less than 1.5 this diameter, preferably between 1.5 and 1.0 times this diameter. The first bending member 11 has a thickness substantially corresponding to the separation distance between the top and bottom channels 53, 54 of the stationary member 13 and has an end face profile 55 corresponding to that of the curved end 52 of the stationary member 13. Accordingly, in the bypass state of FIG. 2, the transmission optical fiber can be loosely contained within the channel 51 and yet captivated by the engaging end 55 of the first bending member 11, the curved end 52 and top and bottom faces 53, 54 of the stationary member 13. When the bypass switch enters its normal state, the first bending member 11 is resiliently urged so that its end 55 is resiliently urged against the optical fiber and against the channel end 52 thus creating the bends 33–35 in the transmission optical fiber, as desired. A preferred embodiment of the construction of the means 31, 32 for bending the transmission and receiver optical fibers is similar to that used for the bending means 33, 34, 35 with the addition of the provision of a transfer means 53 which allows each of the transmitter and receiver fibers to be selectively bent by only one of the means 31, 32. Specifically, referring to the transmitter optical fiber 4, in the bypass state it is captivated and bent between an end of member 12 and a channel end in the stationary member 15 in the manner described by reference to FIG. 5. However, after the bend 32, e.g. to the left in FIG. 2, the transmitter optical fiber travels vertically in the area 53 and can be placed so as to normally reside outside the captivating area to be formed by the end of the member 12 and the stationary member channel for creating the bend 32. According to the embodiment illustrated, the transmitter optical fiber in this location is shown beneath the channel.

An alternative embodiment is to locate the section of the fiber between either the top or bottom face of the channel and a flat face of the member 19 extending substantially perpendicular to the end which resiliently urges the receiver fiber into the bend 31. Similarly, the transmitter optical fiber is bent at the location 31 in the manner illustrated in FIG. 5 and then in the area 53 is moved vertically so as to be located in an area where it is not captivated between the member 19 and the member 15 in an area that the bend 32. It will be appreciated that once the transmitter and receiver fibers are appropriately located, the members 11, 12 can be repetitively moved along the direction of the arrows illustrated in FIGS. 1 and 2 without the transmission and receiver optical fibers being removed from their desired locations so as to be engageable with only one of the bending means 31, 32, one for each fiber.

Though the invention has been described by reference to certain preferred embodiments thereof, the invention is not to be limited thereby and only by the appended claims.

We claim:

1. A method of selectively accessing a transmission optical fiber, comprising the steps of:

withdrawing a first optical signal from a first bend in a transmission optical fiber at a first location and transmitting the first optical signal to a receiver;

injecting a second optical signal from a transmitter into the transmission optical fiber at a second location downstream of the first location on the transmission optical fiber;

disengaging couplers for withdrawing the first signal and for injecting the second signal from and into the transmission optical fiber when a bypass state is desired so that the first optical signal can be transmitted in the transmission optical fiber without being withdrawn and the second signal is not injected into the transmission optical fiber;

connecting the transmitter with the receiver so that signals transmitted by the transmitter can be detected by the receiver when in the bypass state.

2. The method of claim 1, further comprising the step of withdrawing the second optical signal from a transmitter optical fiber connected to the transmitter and injecting the second optical signal into a receiver optical fiber connected to the receiver when the couplers are disengaged.

3. The method of claim 2, the transmitter and receiver being connected by a connector optical fiber which has a first end which receives the second optical signal withdrawn from the transmitter optical fiber and a second end which transmits the second optical signal towards the receiver optical fiber.

4. The method of claim 1, further comprising the step of sensing an improper state of operation of at least one of the transmitter and receiver so as to indicate the bypass state is desired.

5. The method of claim 1, further comprising the step of attenuating any portion of the first optical signal remaining in the transmission optical fiber downstream of the first bend and upstream of the second bend when the withdrawing and injecting means is engaged.

6. An optical coupler for coupling light between a core of an optical fiber and an electromagnetic transducer, comprising:

means for forming a curved channel having a curved end and a top and bottom channel face extending substantially perpendicular from the curved end so as to form a captivating channel for an optical fiber, the top and bottom channel faces being separated by a distance less than twice a diameter of an outer coating of the fiber;

a curved engaging member engageable with the curved channel;

means for urging the engageable member into the channel and keeping the optical fiber bent between an end face of the engaging member and the channel end.

7. The optical coupler of claim 6, the urging means resiliently urging the engageable member into the channel.

* * * * *